United States Patent
Kondo et al.

(10) Patent No.: US 7,933,966 B2
(45) Date of Patent: Apr. 26, 2011

(54) METHOD AND SYSTEM OF COPYING A MEMORY AREA BETWEEN PROCESSOR ELEMENTS FOR LOCK-STEP EXECUTION

(75) Inventors: Thomas J. Kondo, Santa Clara, CA (US); Robert L. Jardine, Cupertino, CA (US); James S. Klecka, Georgetown, TX (US); William F. Bruckert, Los Gatos, CA (US); David J. Garcia, Los Gatos, CA (US); James R. Smullen, Carmel, CA (US); Patrick H. Barnes, Belmont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1765 days.

(21) Appl. No.: 11/114,318

(22) Filed: Apr. 26, 2005

(65) Prior Publication Data

US 2006/0242461 A1    Oct. 26, 2006

(51) Int. Cl.
G06F 15/167    (2006.01)

(52) U.S. Cl. .................. 709/212; 709/213; 709/214

(58) Field of Classification Search .............. 709/217, 709/219, 223–224, 248, 212–214
See application file for complete search history.

(56) References Cited

U.S. PATENT DOCUMENTS

| | | | |
|---|---|---|---|
| 5,384,906 A | 1/1995 | Horst | |
| 5,600,784 A | 2/1997 | Bissett et al. | |
| 5,615,403 A | 3/1997 | Bissett et al. | |
| 5,751,955 A | 5/1998 | Sonnier et al. | |
| 5,790,397 A | 8/1998 | Bissett et al. | |
| 5,884,018 A | 3/1999 | Jardine et al. | |
| 5,896,523 A | 4/1999 | Bissett et al. | |
| 5,956,474 A | 9/1999 | Bissett et al. | |
| 5,956,489 A * | 9/1999 | San Andres et al. | 709/221 |
| 5,966,715 A * | 10/1999 | Sweeney et al. | 707/203 |
| 5,991,518 A | 11/1999 | Jardine et al. | |
| 6,038,685 A | 3/2000 | Bissett et al. | |
| 6,052,797 A * | 4/2000 | Ofek et al. | 714/6 |
| 6,148,412 A * | 11/2000 | Cannon et al. | 714/6 |
| 6,279,119 B1 | 8/2001 | Bissett et al. | |
| 6,308,284 B1 * | 10/2001 | LeCrone et al. | 714/6 |
| 6,327,668 B1 | 12/2001 | Williams | |
| 6,393,582 B1 | 5/2002 | Klecka et al. | |
| 6,449,734 B1 * | 9/2002 | Shrivastava et al. | 714/15 |
| 6,473,869 B2 | 10/2002 | Bissett et al. | |
| 6,543,001 B2 * | 4/2003 | LeCrone et al. | 714/6 |
| 6,606,643 B1 * | 8/2003 | Emens et al. | 709/203 |
| 6,615,405 B1 * | 9/2003 | Goldman et al. | 717/174 |
| 6,654,752 B2 * | 11/2003 | Ofek | 707/10 |
| 6,671,705 B1 * | 12/2003 | Duprey et al. | 707/204 |
| 7,115,919 B2 * | 10/2006 | Kodama | 257/201 |
| 7,237,239 B1 * | 6/2007 | Goel et al. | 717/170 |
| 7,444,337 B2 * | 10/2008 | Zhou et al. | 1/1 |
| 2002/0152420 A1 | 10/2002 | Chaudhry et al. | |
| 2004/0006722 A1 | 1/2004 | Safford | |

* cited by examiner

Primary Examiner — Hussein A Elchanti

(57) ABSTRACT

A method and system of copying a memory area between processor elements for lock-step execution. At least some of the illustrative embodiments may be a method comprising executing duplicate copies of a first program in a first processor of a first multiprocessor computer system and in a first processor of a second multiprocessor computer system (the executing substantially in lock-step), executing a second program in a second processor element of the first multiprocessor computer system (the first and second processors of the first multiprocessor computer system sharing an input/output (I/O) bridge), copying a memory area of the second program executing in the second processor element of the first multiprocessor computer system to a memory of a second processor element in the second multiprocessor computer system while the duplicate copies of the first program are executing in the first processor elements, and then executing duplicate copies of the second program in the second processors in lock-step.

22 Claims, 6 Drawing Sheets

METHOD AND SYSTEM OF COPYING A MEMORY AREA BETWEEN PROCESSOR ELEMENTS FOR LOCK-STEP EXECUTION

BACKGROUND

In order to implement fault tolerance, some computing systems execute duplicate copies of a user program on multiple processor elements in a lock-step fashion. In a dual-modular redundant system, two processor elements are used, and in a tri-modular redundant system, three processor elements are used. Outputs of the duplicate copies of the user program are compared or voted, and in the event the outputs match, they are consolidated and sent to other portions of the computing system. If the outputs do not match, the processor element experiencing a computational or hardware fault is voted out and logically (though not necessarily physically) removed from the system.

In order for the logically removed processor element to resume lock-stepped execution of the duplicate copy of the user program, the memory of the failed processor element needs to be copied from one of the remaining processor elements executing the user program. One mechanism to perform the memory copy is to stop execution of user programs on the processor element or processor elements in the system that did not experience a fault, and copy the entire memory of one of the processor elements to the memory of the failed processor element. However, the amount of memory to be copied may be in the gigabyte range or greater, and thus the amount of time the user program is unavailable may be significant. A second method to copy memory is to cyclically pause the user programs of the non-failed processor elements, and copy a small portion of the memory from a non-failed processor element to the memory of the failed processor element. Eventually, all the memory locations will be copied, but inasmuch as the user programs are operational intermittently with the copying, memory locations previously copied may change. Thus, such a system needs to track memory accesses of a user program to portions of the memory that have already been copied to the memory of the failed processor element. At some point, all the non-failed processor elements are stopped and the memory locations changed by user programs after the memory copy process are copied to the memory of the non-failed processor element. In practice, however, this last step of copying memory locations changed by the user programs may involve a significant number of memory locations, and thus the amount of time that the user programs are unavailable may be excessive.

The problems are further exacerbated in computer systems where the processor elements executing duplicate copies of the user program are distributed through a plurality of computer systems, and those plurality of computer systems also have other processor elements executing other user programs. Depending on the architecture and the interconnections of the various computer systems, copying memory from a non-failed processor element to a failed processor element may affect operation of other logically grouped processor elements executing different user programs.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Figure 1:
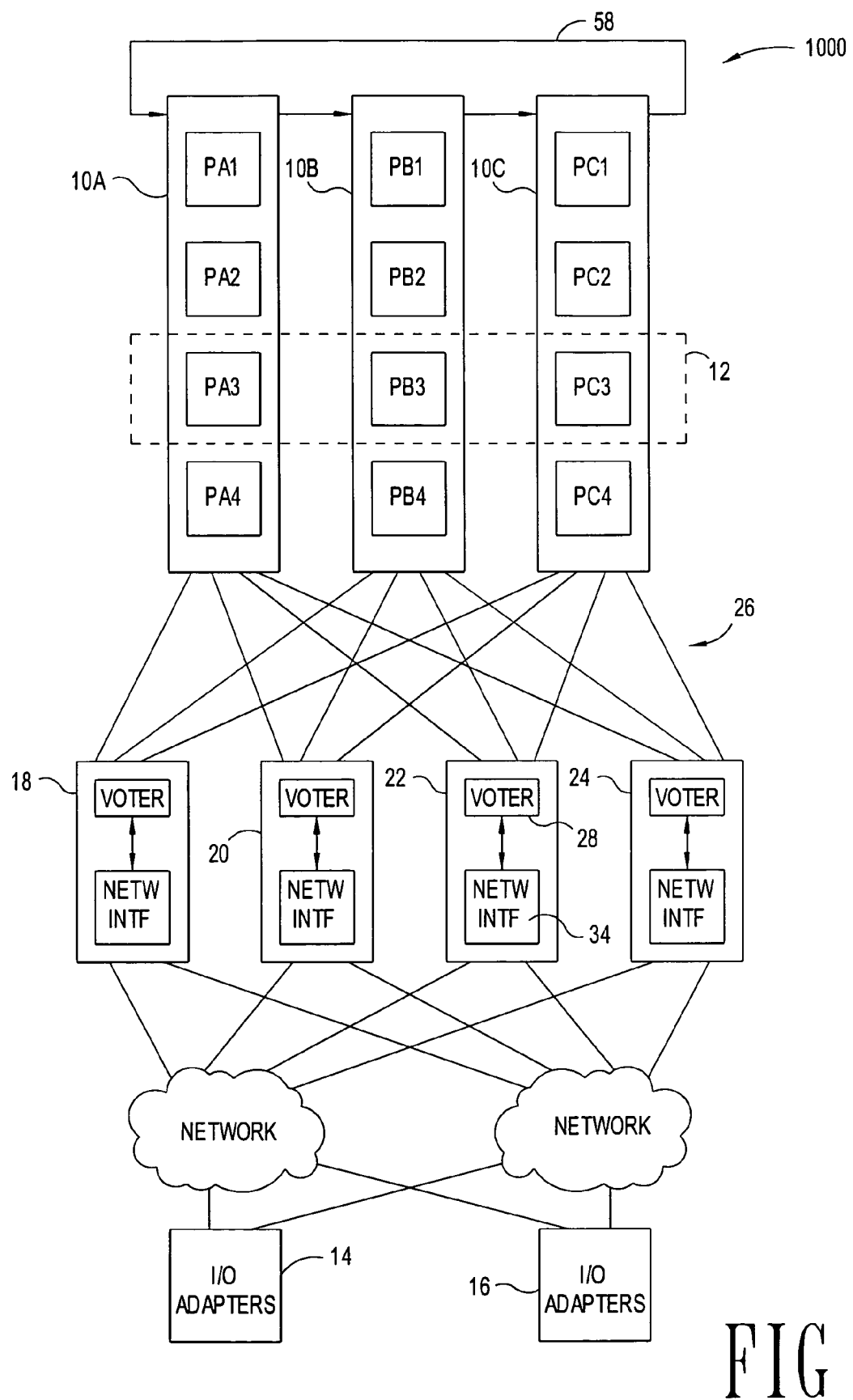
FIG. 1 illustrates a computing system in accordance with embodiments of the invention.

FIG. 1 illustrates the computing system 1000 in accordance with embodiments of the invention. In particular, the computing system 1000 comprises a plurality of multiprocessor computer systems 10. In some embodiments, only two multiprocessor computing systems 10 are used, and as such the computing system 1000 may implement a dual-modular redundant (DMR) system. As illustrated in FIG. 1, the computing system 1000 comprises three multiprocessor computer systems 10, and therefore implements a tri-modular redundant (TMR) system. Regardless of whether the computer system is dual-modular redundant or tri-modular redundant, the computing system 1000 implements fault tolerance by redundantly executing user programs across multiprocessor computer systems.

In accordance with embodiments of the invention, each multiprocessor computer system 10 preferably comprises one or more processor elements, and as illustrated in FIG. 1, four processor elements. Each processor element of FIG. 1 has a leading "P." Further, each processor element is given a letter designation of "A," "B," or "C," to indicate the processor element's physical location within one of the multiprocessor computer systems 10A, 10B and 10C, respectively. Finally, each processor element is given a numerical designation to indicate that processor element's location within each multiprocessor computer system. Thus, for example, the processor elements in multiprocessor computer system 10A have designations "PA1," "PA2," "PA3," and "PA4."

In accordance with embodiments of the invention, at least one processor element from each multiprocessor computer system 10 may be logically grouped to form a logical processor. In the illustrative embodiments of FIG. 1, processor elements PA3, PB3, and PC3 are grouped to form logical processor 12. In accordance with embodiments of the invention, each processor element within a logical processor substantially simultaneously executes duplicate copies of a user program, thus implementing fault tolerance. More particularly, each processor element within a logical processor is provided the same instruction stream for the user program and computes the same results (assuming no errors). In some embodiments, the processor elements within a logical processor are in strict or cycle-by-cycle lock-step. In alternative embodiments, the processor elements are in lock-step, but not in cycle-by-cycle lock-step (being in lock-step but not in cycle-by-cycle lock-step also known as loosely lock-stepped), with handling of interrupts occurring at rendezvous opportunities, such as system calls (discussed below). In some embodiments, the processor elements have non-deterministic execution, and thus strict lock-step may not be possible. In the event one of the processor elements fails, the one or more remaining processor elements continue without affecting overall system performance.

Inasmuch as there may be two or more processor elements within a logical processor executing the same user programs, duplicate reads and writes may be generated, such as reads and writes to input/output (I/O) adapters 14 and 16. The I/O adapters 14 and 16 may be any suitable I/O adapters, e.g., a network interface card, or a hard disk drive. In order to compare the reads and writes for purposes of fault detection, each logical processor has associated therewith a synchronization logic. For example, processor elements PA1, PB1 and PC1 form a logical processor associated with synchronization logic 18. Likewise, the processor elements PA2, PB2 and PC2 form a logical processor associated with synchronization logic 20. The logical processor 12 is associated with synchronization logic 22. Finally, processor elements PA4, PB4 and PC4 form a logical processor associated with synchronization logic 24. Thus, each multiprocessor computer system 10 couples to each of the synchronization logics 18, 20, 22 and 24 by way of an interconnect 26. The interconnect 26 is a Peripheral Component Interconnected (PCI) bus, and in particular a serialized PCI bus, although any bus or network communication scheme may be equivalently used.

Each synchronization logic 18, 20, 22 and 24 comprises a voter logic unit, e.g., voter logic 28 of synchronization logic 22. The following discussion, while directed to voter logic 28 of synchronization logic 22, is equally applicable to each voter logic unit in each of the synchronization logics 18, 20, 22 and 24. The voter logic 28 acts to consolidate read and write requests from the processor elements, and plays a role in the exchange of information between processor elements. Consider for purposes of explanation each processor element in logical processor 12 executing its copy of a user program, and that each processor element generates a read request to network interface 34. Each processor element of logical processor 12 sends its read request to the voter logic 28. The voter logic 28 receives each read request, compares the read requests, and (assuming the read requests agree) issues a single read request to the network interface 34. In response to the single read request issued by a synchronization logic, the illustrative network interface 34 returns the requested information to the voter logic 28. In turn, the voter logic replicates and passes the requested information to each of the processor elements of the logical processor. Likewise, for other input/output functions, such as writes and transfer of packet messages to other programs (possibly executing on other logical processors), the synchronization logic ensures that the requests match, and then forwards a single request to the appropriate location. In the event one of the processor elements in the logical processor does not function properly (e.g., fails to generate a request, fails to generate a request within a specified time, generates a non-matching request, or fails completely), the offending processor element is voted out and the overall user program continues based on requests of the remaining processor element or processor elements of the logical processor.

Figure 2:
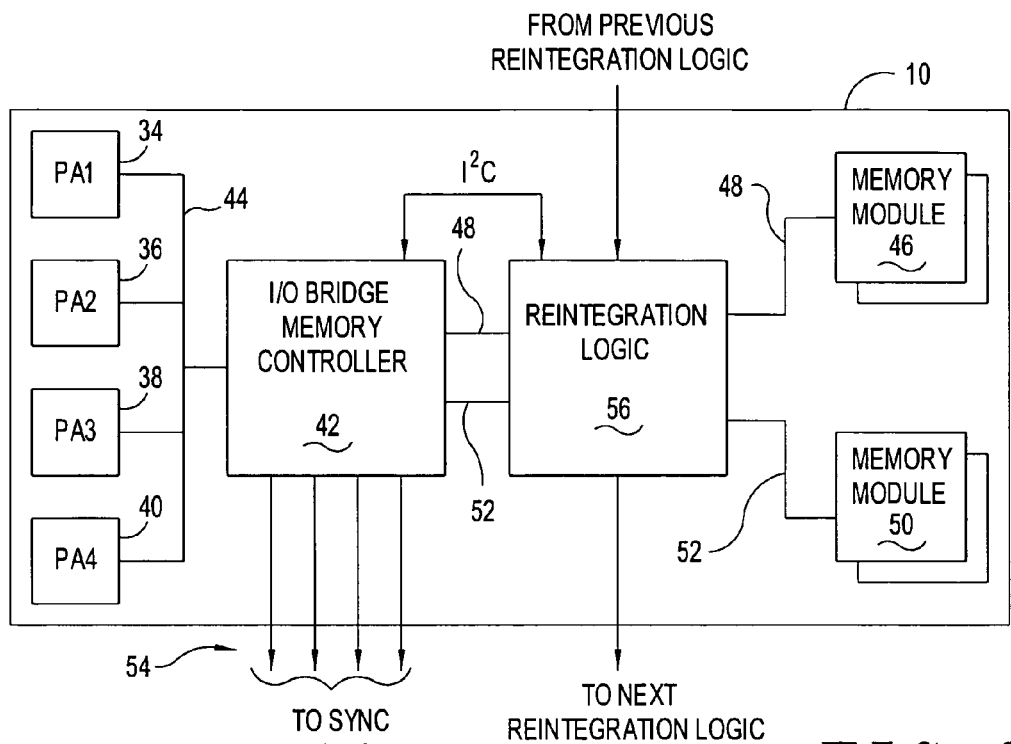
FIG. 2 illustrates in greater detail a multiprocessor computer system in accordance with embodiments of the invention.

FIG. 2 illustrates in greater detail a multiprocessor computer system 10. In particular, FIG. 2 illustrates that a multiprocessor computer system 10 in accordance with embodiments of the invention may have a plurality of processor elements, in the illustrative case of FIG. 2 four such processor elements 34, 36, 38 and 40. While only four processor elements are shown, any number of processor elements may be used without departing from the scope and spirit of the invention. The processor elements 3440 may be individually packaged processor elements, processor element packages comprising two or more dies within a single package, or multiple processor elements on a single die. Each of the processor elements may couple to an I/O bridge and memory controller 42 (hereinafter I/O bridge 42) by way of a processor bus 44. The I/O bridge 42 couples the processor elements 34, 36 to one or more memory modules 46 by way of a memory bus 48. Likewise, the I/O bridge 42 couples the processor elements 38, 40 to one or more memory modules 50 by way of memory bus 52. Thus, the I/O bridge 42 controls reads and writes to the memory area defined by the memory modules 46 and 50. The I/O bridge 42 also allows each of the processor elements 3440 to couple to synchronization logics (not shown in FIG. 2), as illustrated by bus lines 54.

FIG. 2 also shows that each multiprocessor computer system 10 comprises a reintegration logic 56 coupled between the I/O bridge 42 and the memory modules 46, 50. The illustrative embodiments of FIG. 1 show the interconnections of the reintegration logics (line 58) in the form of a ring, but any network topology may be equivalently used. At times when a processor element's memory is not being replaced by that of a non-failed processor element, the reintegration logic 56 is transparent to the I/O bridge 42, and does not interfere with reads and writes to the one or more memory modules 46, 50. However, in the event that one processor element within a logical processor is newly inserted, or experiences a fault, and needs to be reintegrated, the reintegration logic 56 enables copying of memory from operational processor elements, so that the formerly non-operational processor element can begin at the same point as the other processor elements in the logical processor.

Figure 3:
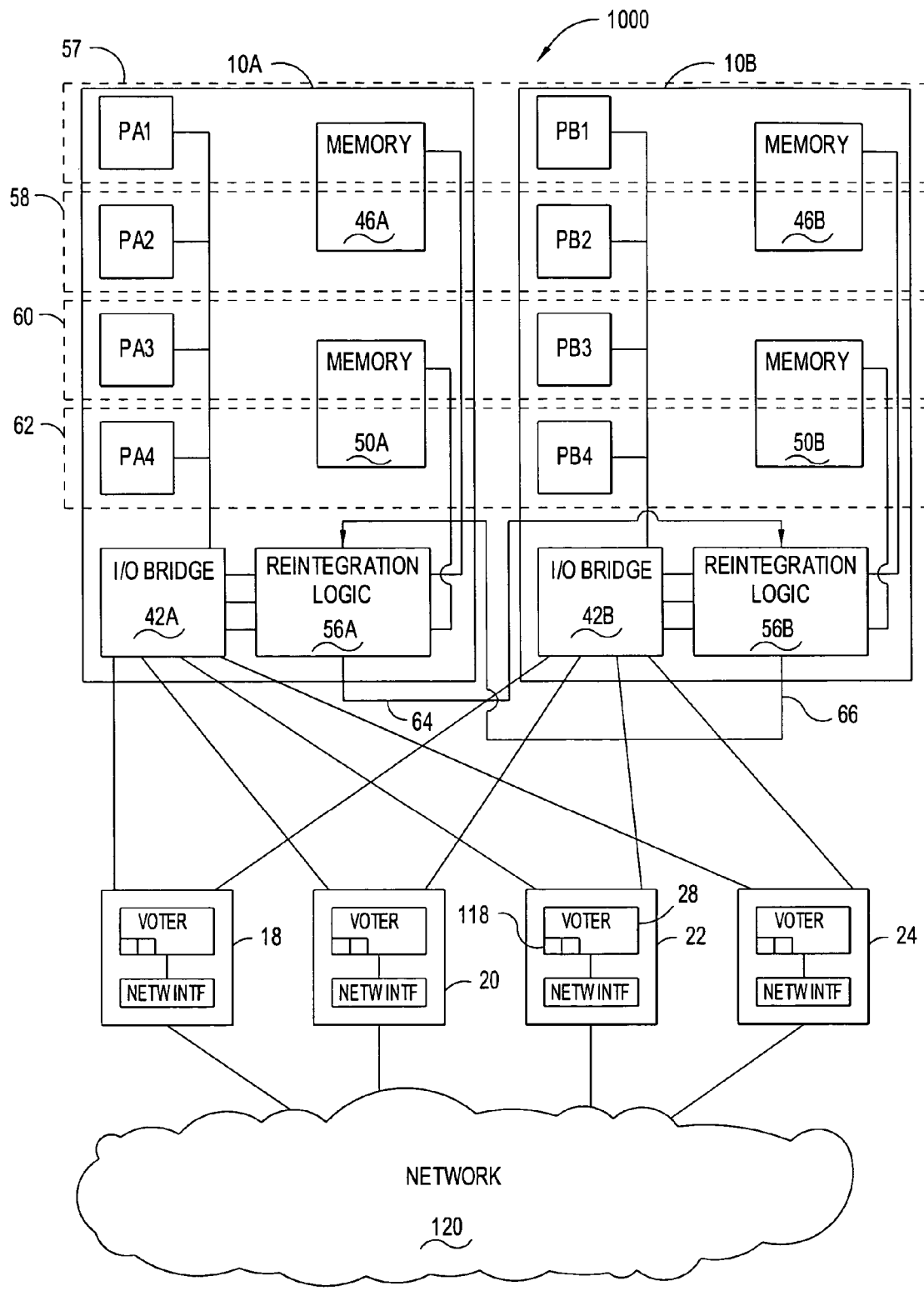
FIG. 3 illustrates interconnection of computer systems in accordance with embodiments of the invention.

FIG. 3 illustrates a partial computing system 1000 in order to describe operation of the various components that work together to perform reintegration of the memory of a processor element in systems having multiple logical processors. FIG. 3 is a simplified version of FIG. 1 in the sense that the computing system 1000 comprises only two multiprocessor computer systems 10A and 10B, and further does not explicitly show I/O adapters. FIG. 3 is also, in another sense, more detailed than FIG. 1 inasmuch as FIG. 3 illustrates how the processor elements couple to their respective memories and the voter logic through the I/O bridge 42. Moreover, the layout of FIG. 3 indicates the relationships between the logical processors and the memory within each multiprocessor computer system. For example, logical processor 57, comprising processor elements PA1 and PB1, uses at least a portion of memory 46 in each multiprocessor computer system 10. Likewise, logical processor 58, comprising processors elements PA2 and PB2, also utilizes a portion of the memory 46 in each of the multiprocessor computer systems 10. Logical processor 60, comprising processor elements PA3 and PB3, uses a portion of the memory 50. Finally, logical processor 62, comprising processor elements PA4 and PB4, also utilizes a portion of the memory 50 in each of the multiprocessor computer systems 10. Further, each multiprocessor computer system 10 comprises a reintegration logic 56 coupled between the respective I/O bridge 42 and the memory 46, 50. Reintegration 56A has an output communication port that couples to an input communication port of reintegration logic 56B, e.g., by way of communication link 64. Likewise, reintegration logic 56B has an output communication port that couples to an input communication port of reintegration logic 56A, e.g., by way of communication link 66. Although only two multiprocessor computer systems 10 are illustrated in FIG. 3, if additional multiprocessor computer systems are present the respective I/O bridges likewise couple to the synchronization logics 18-24, and their respective reintegration logics couple in series with, or some other configuration, the reintegration logics 56. Only two multiprocessor computer systems 10 are shown in FIG. 3 so as not to unduly complicate the figure and the description of operation based on the figure.

Figure 4:
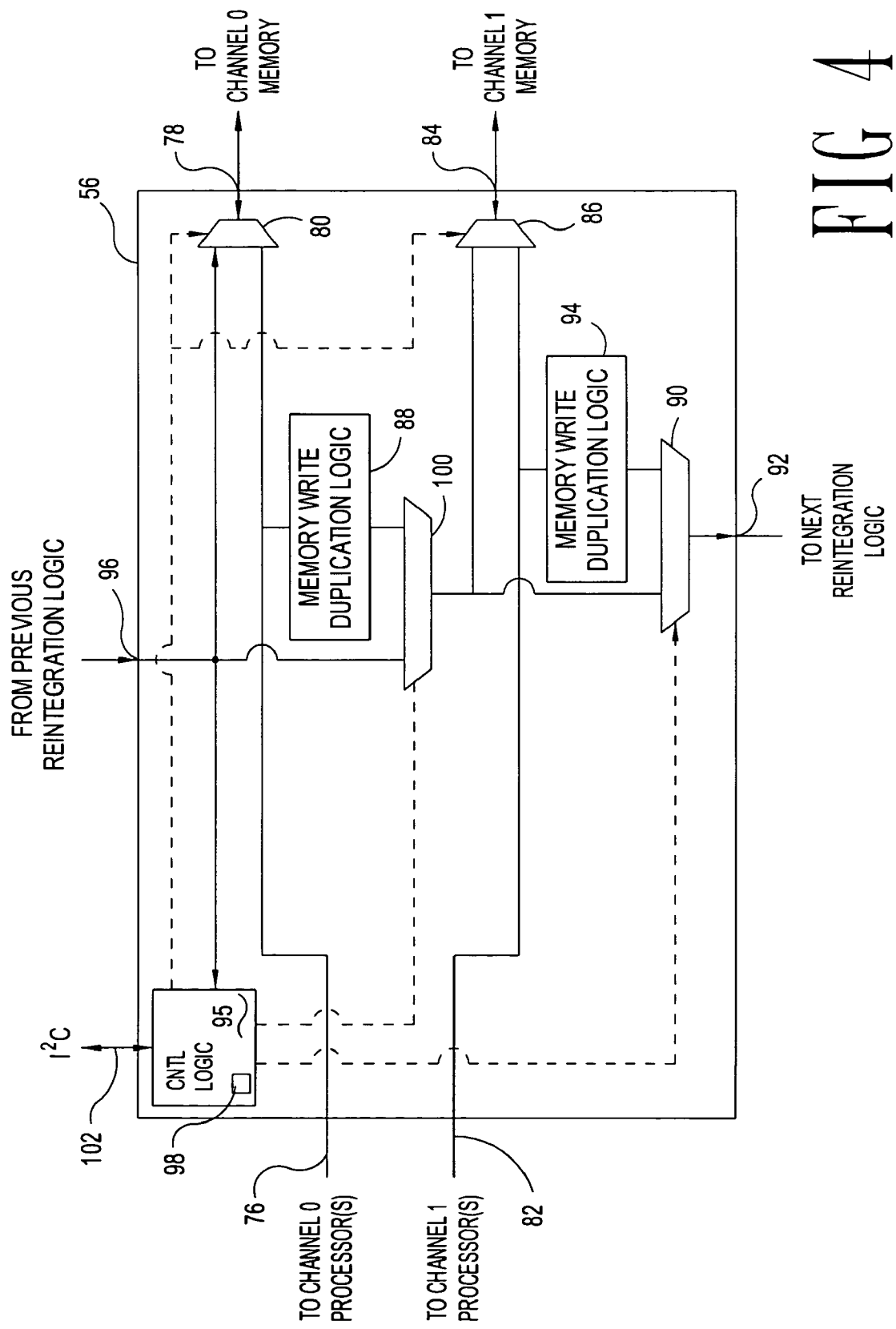
FIG. 4 illustrates a reintegration logic in accordance with embodiments of the invention.

FIG. 4 illustrates in greater detail a reintegration logic 56 in accordance with embodiments of the invention. The functionality implemented within the reintegration logic 56 may take many forms. In some embodiments, each reintegration logic 56 is an application specific integrated circuit (ASIC) designed specifically to implement the functionality. In alternative embodiments, the reintegration logics 56 each comprise a microprocessor or microcontroller, and related hardware, where the functionality is implemented by way of software routines. In particular, a reintegration logic 56, in accordance with embodiments of the invention, comprises a communication port 76 that couples to one or more local processor elements (within the same multiprocessor computer system 10), possibly through an I/O bridge 42. For this reason, communication port 76 may alternatively be referred to as a processor communication port. The reintegration logic 56 also comprises communication port 78 that couples to local memory, such as memory 46. For this reason, communication port 78 may alternatively be referred to as a memory communication port. During periods of time when no reintegration is taking place with respect to memory coupled to communication port 78, switch logic 80 couples the processor communication port 76 to the memory communication port 78. Reintegration logic 56 further comprises a processor communication port 82 that couples to one or more local processor elements, possibly through I/O bridge 42. The reintegration logic 56 also comprises memory communication port 84 that couples to local memory, such as memory 50. During periods of time when no reintegration is taking place with respect to memory coupled to communication port 84, the switch logic 86 couples processor communication port 82 to the memory communication port 84. In the configuration where the processor communication ports 76 and 82 couple respectively to memory communication ports 78 and 84, the reintegration logic 56 is transparent to memory reads and writes between connected processor elements and their respective memory.

Still referring to FIG. 4, a reintegration logic 56 in accordance with embodiments of the invention further comprises a first memory write duplication logic 88. The first memory write duplication logic 88 monitors memory transactions between processor communication port 76 and memory communication port 78, duplicates memory writes, and sends the duplicated memory writes to other reintegration logics by way of switch logics 90, 100 and output communication port 92. Reintegration logic 56 further comprises a second memory write duplication logic 94. The second memory write duplication logic 94 monitors memory transactions between processor communication port 82 and memory communication port 84, duplicates memory writes, and sends those duplicated memory writes to other reintegration logics by way of switch 90 and output communication port 92. While in some embodiments the duplicated writes are sent relatively unchanged, in alternative embodiments the memory write address and data is wrapped with a cyclic redundancy check code so that the integrity of communication between reintegration logics 56 may be tested by the receiving reintegration logic. Thus, the illustrative reintegration logic 56 also comprises a control logic 95 that couples to the input communication port 96 carrying duplicated memory writes from another reintegration logic. In embodiments where the duplicated memory writes are wrapped in a cyclic redundancy check code, control logic 95 performs a cyclic redundancy check on each received message. Control logic 95 also couples to switch logic 80, switch logic 86, switch logic 90 and switch logic 100, and selectively commands each switch logic to configure how the various processor elements, memory, upstream reintegration logics, and downstream reintegration logics are coupled. Control logic 95 commands the switch logics at the behest of one of its locally coupled processor elements, such as by communications through an I$^2$C bus 102. The I$^2$C bus 102 is a dual line, multi-drop serial bus developed by Phillips Semiconductor® that comprises a clockline and one data line. The devices connected to an I$^2$C bus act as either primary or secondary devices, and each devices is software addressable by a unique address. Primary devices operate as transmitters, receivers, or combination transmitter/receivers to initiate 8-bit data transfers between devices on the bus. The I$^2$C bus utilizes collision detection and arbitration to prevent data corruption if two or more primaries simultaneously transfer data. Details regarding the I$^2$C bus may found in "The I$^2$C Bus Specification," version 2.1 (January 2000), authored by Phillips Semiconductor®.

Still referring to FIG. 4, thus, the reintegration logic's 56 locally coupled processor element commands the reintegration logic 56 to switch configuration of the switch logics 80, 86, 90 and 100 to allow selective copying of memory for purposes of reintegration by writing one or more registers 98 within the control logic 95 across the I$^2$C bus 102. Likewise, when copying of memory for purpose of reintegration is complete, the attached processor element writes a different value to the register 98, which the control logic 95 recognizes as a command to switch the position of the various switch logics.

There are a plurality of coupling configurations of the various communication ports of the reintegration logic 56 in accordance with embodiments of the invention. When the reintegration logic is acting as a transparent device to memory reads and writes, switch logic 80 couples processor communication port 76 to memory communication port 78 (memory channel 0), and switch logic 86 couples processor communication port 82 to memory communication port 84 (memory channel 1). The table of FIG. 5A, in particular entry 104, illustrates a shorthand notation for the reintegration logic 56 being transparent to memory reads and writes on both channels.

Referring again to FIG. 4, even though the reintegration logic 56 may be transparent to memory reads and writes between locally coupled processor elements and locally coupled memory, the reintegration logic further selectively creates a duplicate stream of memory writes for either memory channel. Memory write duplication logic 88 monitors memory communications on channel 0, and memory write duplication logic 94 monitors channel 1. Each of these logics 88, 94 duplicate memory writes on their respective monitored channel, and apply those memory writes to switch logics 100 and 90 respectively. Thus, depending on the configuration of switch logics 90, 100, the reintegration logic 56 selectively couples the streams of duplicate memory writes to the duplicate memory write output port 92. Consider, for example, that switch logic 90 couples the stream of duplicate memory writes created by the memory write duplication logic 94 to the output port 92 while still acting transparently to memory reads and writes on each memory channel. Such a situation is illustrated in shorthand notation by entry 110 of FIG. 5A. Entry 106 illustrates a situation where switch logics 90 and 100 are configured to couple the stream of duplicate memory writes created by the memory write duplication logic 88 to the output port 92. As will be discussed more thoroughly below, selectively coupling one of the stream of duplicate memory writes to the output communication port 92 allows copying of memory and thus reintegration of the processor elements whose reintegration logic is downstream of the illustrative output communication port 92 of FIG. 4.

While in some configurations the illustrative reintegration logic 56 creates a stream of duplicate memory writes that may be supplied to downstream devices, the reintegration logic 56 also accepts a stream of duplicate memory writes, and couples that stream of duplicate memory writes selectively to one of its locally coupled memories. Thus, switch logic 80 may be configured to couple a stream of duplicate memory writes provided on the duplicate memory write input port 96 to the memory communication port 78. Assuming that channel 1 is still acting transparently to memory reads and writes, this illustrative situation is shown by entry 112 of the table of FIG. 5A. Likewise by configuring switch logic 86 and switch logic 100, the reintegration logic 56 couples the stream of duplicate memory writes on the input port 96 to the memory communication port 84. Assuming that channel 0 is acting transparently to memory reads and writes, this illustrative situation is shown by entry 108 of the table of FIG. 5A.

Returning again to FIG. 3, processor elements within a logical processor, though within different multiprocessor computer systems 10, communicate by way of their respective synchronization logics. For example, voter logic 28 of synchronization logic 22, illustrative of all the voter logics, comprises a plurality of registers 118. The processor elements within the logical processor may exchange messages with other processor elements of their logical processor by writing data (in a non-voted fashion) to the registers 118, and then requesting that the voter logic 28 inform the other processor elements of the logical processor of the presence of data by sending those other processor elements an interrupt (or by polling). Consider, for example, an illustrative communication in logical processor 60 between processor element PB3 and processor element PA3. To send a message within this logical processor, processor element PB3 writes data to one or more of the registers 118, and then requests that the voter logic 28 issue an interrupt to the remaining processor elements of the logical processor. Processor element PA3, receiving the interrupt and decoding its type, reads the information from the one or more registers 118 in the voter logic. If additional processor elements are present within a logical processor, these processor elements may also receive the interrupt and may also read the data. Communications within a logical processor utilizing the respective synchronization logics will be referred to herein as a horizontal communication.

Still referring to FIG. 3, there are situations where programs executing within a logical processor need to communicate with programs executing in other logical processors. In accordance with embodiments of the invention, communications between logical processors takes place by the logical processor sending packet-based messages through its respective synchronization logic to the network 120. Communication between logical processors, whether by packet-based messages or by interrupts issued within a multiprocessor computer system 10, will be referred to herein as a vertical communication. The synchronization logic of the target logical processor receives the message, and forwards the message to the logical processor. Because the processor elements in the logical processor, in accordance with embodiments of the invention, operate in loose lock-step, the messages sent between logical processors are generated in each processor element by its respective copy of the program that generates the message. Thus, communications between logical processors are voted in their respective synchronization logics just like any output. By contrast, in communications within a logical processor, at least one processor element may not be operating in lock step with the other processor elements. For example, in a tri-modular redundant system, a horizontal communication may take place between a halted processor element and the remaining two processor elements still operating in lock-step.

Consider for purposes of explanation that the system illustrated in FIG. 3 is operational with each of the logical processors executing duplicate copies of their respective user programs. Further consider that processor element PB1 experiences a computational fault, and the synchronization logic 18 votes PB1 out of service. In order to bring processor element PB1 back into operation, it is necessary to reintegrate processor element PB1 by copying memory from a non-failed processor element, such as processor element PA1. However, in the illustrative embodiments of FIG. 3, though four processor elements are used within each multiprocessor computer system 10, there are only two memory channels between the I/O bridge 42 and the memories 46, 50 (through the reintegration logic 56). Processor element PB2 shares a memory channel with processor element PB1, and thus to copy the memory area for processor element PB1 (from processor element PA1) also involves copying the memory area for processor element PB2 (from processor element PA2). In alternative embodiments, each processor element has a memory channel to its respective memory, and thus copying memory for an otherwise non-failed processor element would not be required. In yet further alternative embodiments, each multiprocessor computer system 10 has only a single memory channel to a shared memory, and thus failure of any processor element in the multiprocessor computer system necessitates copying of memory for each processor element in the multiprocessor computer system.

The reason the memory of a non-failed, non-source processor element is copied if that processor element shares a memory channel with a failed processor element has to do with memory channel bandwidth and the lack of flow control on memory interfaces. Copying memory in accordance with embodiments of the invention involves duplicating memory writes from a non-failed source processor element, and applying those memory writes to the memory of the failed processor element. The non-failed source processor element, however, may be capable of generating a stream of memory writes that requires the entire bandwidth of the memory channel. If this is the case, then there is no additional bandwidth of the memory channel for the non-failed, non-source processor element to operate, and thus it too ceases operation. In order for the non-failed, non-source processor element that shares a memory channel with a failed processor element to resume then, its memory needs to be copied from a non-failed processor element within its logical processor that did not cease operation. In alternative embodiments, there could be multiple memory channels coupling the processor elements, thus negating the need for a non-failed, non-source processor element to have its memory overwritten. The advantage of a system that uses shared memory channels is the ability to perform memory copies to failed processors, without the cost of implementing separate memory channels to each processor.

Thus, where memory channels are shared as between processor elements of different logical processors, copying of memory for purposes of reintegration of a failed or otherwise halted processor element is an operation that involves coordination between logical processors. In the illustrative case of a voting failure of processor element PB1 of logical processor 57, processor element PB2 of logical processor 58 is also halted because it shares a memory channel with processor PB1. The memory of processor PB1 is reproduced from another processor element of logical processor 58. In order to achieve this coordination, and in accordance with embodiments of the invention, each processor element within a logical processor executes a reintegration control program. Because each processor element of a logical processor operates in lock-step, the reintegration control program too is executed in loose lock-step across a logical processor. Moreover, each logical processor executes its own version of the reintegration control program, although the execution as between logical processors is not necessarily in loose lock-step. From this point forward, reference to a reintegration control program executing in a logical processor implicitly refers to one or more reintegration control programs executing in lock-step on each processor element within a logical processor.

In order to coordinate copying of memory for purposes of reintegration of a halted or failed processor element, one of the reintegration control programs of the logical processors of the system is chosen or elected to be the reintegration leader. All requests by a halted or failed processor element to join lock-step operation (a horizontal communication) are forwarded to the reintegration leader (a vertical communication), and the reintegration leader then coordinates the copying and reintegration process.

Still referring to FIG. 3, and considering the illustrative situation where a processor element PB1 has a voting failure and is removed from loose lock-step operation. After being voted out, processor element PB1 retreats to operating low level software, and the low level software immediately begins attempts to bring the processor element back into lock-step operating with other processor elements in the logical processor. In situations were a multiprocessor computer system is newly inserted into the computing system, the low level software in each processor element performs the same task of attempting to bring each processor element into lock-step operation. Thus, the illustrative failed or newly inserted processor element PB1 communicates (a horizontal communication) with other processor elements in the logical processor 57, in the illustrative case of FIG. 3 processor element PA1. Assuming that the reintegration control program executing in the logical processor 57 is not the reintegration leader, the reintegration control program communicates to the reintegration leader the desire of the processor element PB1 to rejoin lock-step (a vertical communication). Assume for purposes of this explanation that the reintegration control program of logical processor 62 is the reintegration leader. The reintegration control program of logical processor 62 (being the illustrative reintegration leader) receives the request regarding processor element PB1, and any other similar requests, and arbitrates between them. When the request of processor element PB1 is of the highest priority, the reintegration leader begins the process of configuring the overall computing system 1000 for the memory copy. Being programmed to know, or determining, that processor elements of logical processor 57 share a memory channel with processor elements of logical processor 58, the reintegration leader requests (a vertical communication) that the reintegration control program in each participating logical processor inform their respective synchronization logic to remove processor elements, e.g., PB1 and PB2.

After each processor element to which memory will be copied (hereinafter the target processor elements) are removed from the voting system, the next step is for each target processor element to quiesce, meaning that each target processor element operates only low-level system programs, and runs those low-level system programs from the cache of the processor element, out of flash ROM, programmable ROM or RAM other than the main memory (thus leaving the main memory untouched). Thus, the reintegration leader sends a message (a vertical communication) to the reintegration control program in each participating logical processor. The reintegration control program, in turn, communicates the command to quiesce (a horizontal communication) to each target processor element. In the illustrative situation of FIG. 3, the quiesce command is transferred to processor elements PB1 and PB2. After reintegration leader receives an acknowledgment that the target processor elements have been removed from the voting system and have quiesced (a vertical communication), the reintegration leader then sends a request (a vertical communication) for one of the reintegration control programs executed in each multiprocessor computer system 10 to reprogram their respective reintegration logics. For this illustrative case, reintegration logic 56A is programmed to couple the stream of duplicate memory writes created by its memory write duplication logic 88 (FIG. 4) to the duplicate memory write output port 92 (FIG. 4) which couples between reintegration logic 56A and 56B by way of bus 64. This exemplary configuration of reintegration logic 56A is shown as entry 106 in the shorthand notation of the table of FIG. 5A. Likewise, reintegration logic 56B is programmed to couple the stream of duplicate memory writes presented on its duplicate memory write input port 96 to the memory communication port 78. This illustrative configuration of the reintegration logic 56B is shown as entry 112 of the table of FIG. 5A. Notice that in each case memory channel 1 of the reintegration logics 56 are configured for transparent communication of memory reads and writes.

After the reintegration leader receives notification (a vertical communication) that the reintegration logics have been reconfigured, the reintegration leader then sends a message (a vertical communication) to each logical processor 57 and 58 that triggers each non-target processor element of the logical processors to begin execution of a background task that atomically reads and subsequently writes every memory location in the memory area available to the particular processor element. The intent of reading and writing each memory location is to force a cache fill and then, without modifying the data, force a cache writeback for all memory locations. The memory write duplication logic 88 of reintegration logic 56A duplicates each memory write (in this case from both logical processors 56 and 58), and applies that stream of duplicate memory writes to the reintegration logic 56B. Reintegration logic 56B applies the stream of memory writes to memory 46B. By having the background task read and subsequently write every location of the memory 46A, every memory location in memory 46B is likewise written. Although user programs executing in each logical processor, as well as I/O operations, may also be writing substantially simultaneously with the background task, these writes too are duplicated, and while some memory locations may be written multiple times, the end result is that the memory will be the same when the background task completes its read and subsequent write of every memory location. For more information regarding duplicating memory by use of a stream of duplicate memory writes, reference may be had to co-pending application Ser. No. 11/114,319, now U.S. Pat. No. 7,590,885, titled "Method and System of Copying Memory From A Source Processor To A Target Processor By Duplicating Memory Writes," incorporated by reference as if reproduced in full below.

Still referring to FIG. 3, once the background task in each logical processor 57 and 58 completes its task of reading and subsequently writing every memory location available to the logical processor (and thus every memory location in memory 46A) a message is sent (a vertical communication) to the reintegration leader. Once the memory copy is complete in all affected logical processors (copying may complete at different times), the reintegration leader sends a message to the source processor elements of each logical processor to quiesce, save register state, flush cache, disable interrupts, and block I/O. In this case, only PA1 and PA2 perform these final steps. By the source processor element of each logical processor flushing its cache, the last of the possible memory locations where the memories 46A and 46B could differ are therefore written by the source processor elements and duplicated to the memory of the target processor elements. When saving the register state, flushing the cache and suspending I/O are complete, the source processor elements in the logical processors 57 and 58 send a message (a vertical communication) to the reintegration leader that these steps are complete. After confirming that each logical processor involved in the reintegration has completed its register state save, cache flush and related operations, the reintegration leader sends a message (a vertical communication) to one target processor element to reconfigure the respective reintegration logic 56 to again be transparent to memory reads and writes on both memory channels (as illustrated by entry 104 in the table of FIG. 5A). The former source processor elements send a message to the reintegration leader (a vertical communication) that at least the reintegration logic 56B has been reconfigured for transparent operation. The reintegration leader then sends a message to the reintegration control program in each logical processor (a vertical communication) commanding the reintegration control programs in each logical processor to inform their respective synchronization logics that the target processor elements may now participate in voting. Finally, the reintegration control program in each logical processor sends a message (horizontal communication) to the target processor element that contains an address of a program at which the target processor element should resume execution. All the processor elements of the logical processor are thus operational and synchronized, and therefore I/O is enabled and the reintegration is complete.

Figure 6A:
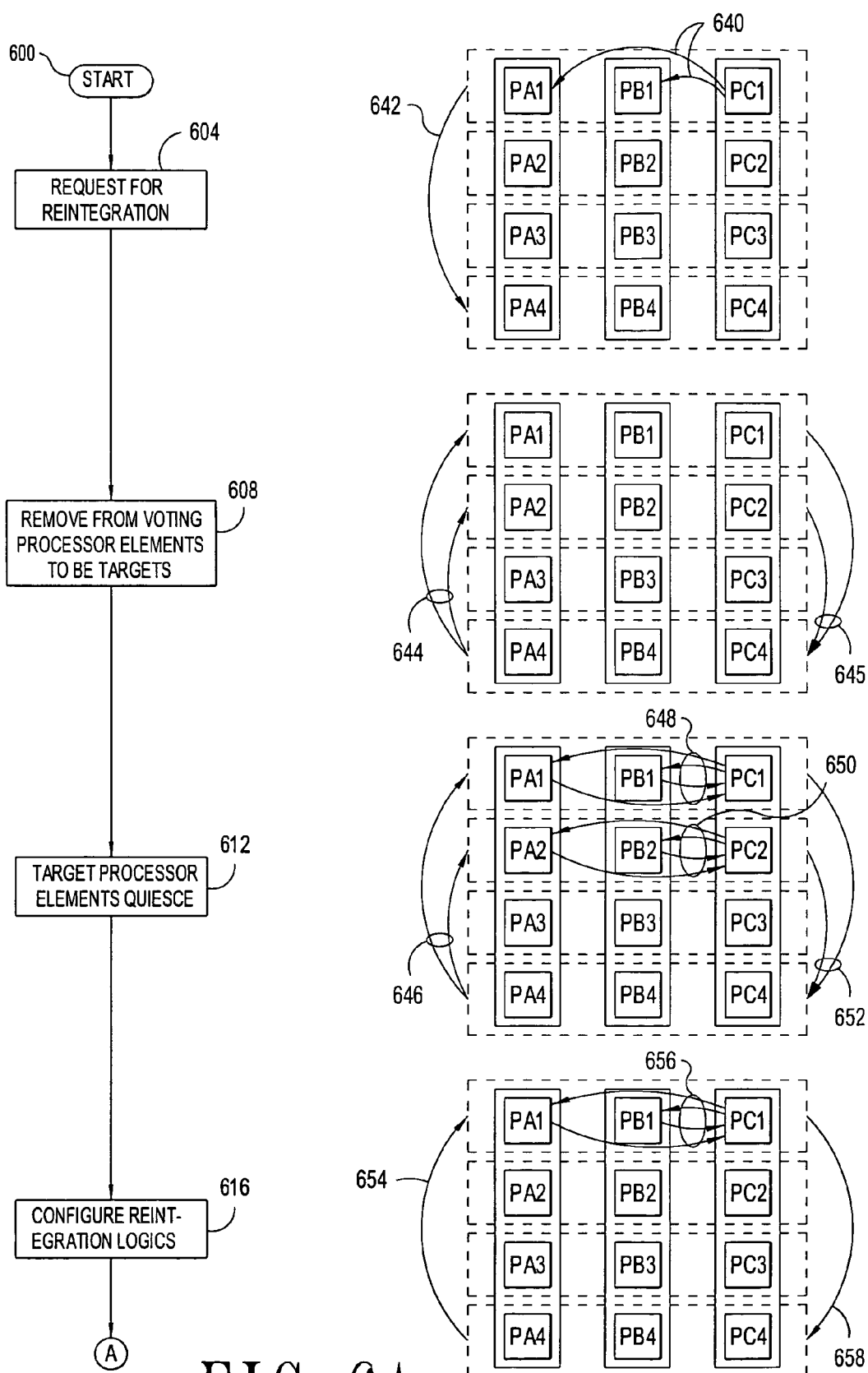
FIG. 6 (comprising FIGS. 6A and 6B) illustrates a method in accordance with embodiments of the invention.
Figure 6B:
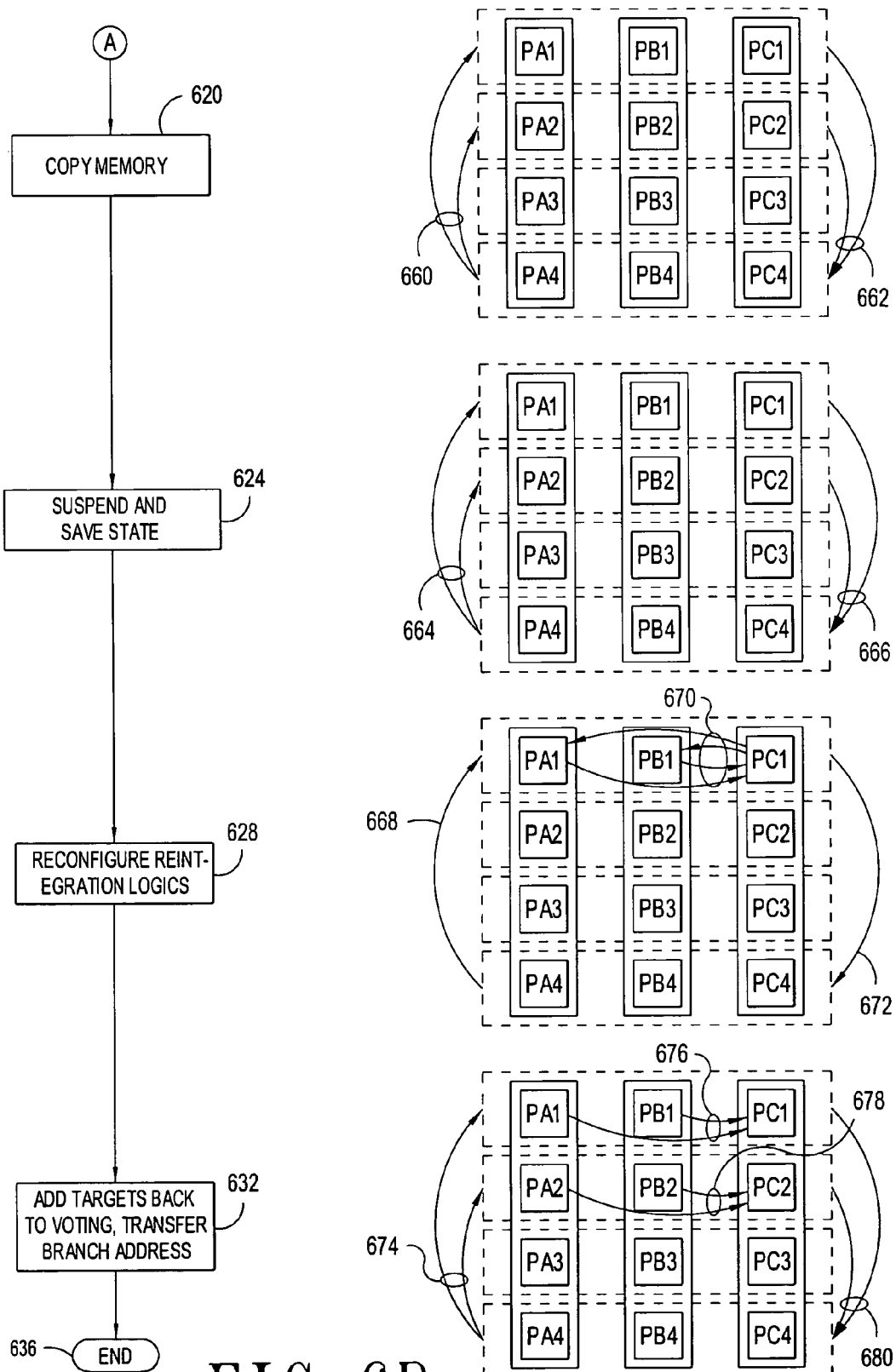

The reintegration discussed with respect to the illustrative FIG. 3 is with respect to the computing system 1000 having only two multiprocessor computer systems 10. FIG. 6 (comprising FIGS. 6A and 6B) is a high level flow diagram of the reintegration process for a computing system comprising three multiprocessor computer systems, with each multiprocessor computer system comprising four processor elements, and thus the overall system having four logical processors. Next to each of the illustrative method steps is a simplified diagram of a tri-modular redundant system. Communications between logical processors and the reintegration leader are illustrated with vertical arrows on the left and right side of each diagram. Likewise, communication between processor elements within each logical processor is illustrated with horizontal arrows.

The illustrative process starts (block 600) by a processor element within a logical processor sending a request to be reintegrated (block 604). The reintegration control program of the logical processor forwards the request to the reintegration leader. In the illustration of FIG. 6A, the request for reintegration is illustrated by lines 640, showing that processor element PC1 is operating in low-level system code and is requesting reintegration. The logical processor comprising processor element PC1 then forwards the request to the reintegration leader, as illustrated by line 642, and in this illustrative case the reintegration leader is the logical processor comprising processor elements PA4, PB4 and PC4.

The next step in the illustrative process is for the reintegration leader to instruct the reintegration control program in each participating logical processor to isolate its respective processor element (block 608). In the illustrative diagram associated with this step, because of shared memory channels, two logical processors are involved in the reintegration. The reintegration leader's communication to these logical processors to remove a processor element from the voting is illustrated by lines 644. The reintegration control program in each processor element acknowledges completion of the removal, as illustrated by lines 645. In this illustrative case, processor elements PC1 and PC2 are removed from voting (however PC1, making the initial request for reintegration, is most likely already removed from the voting process). Each of these processor elements thus retreat to operating low-level system code.

The next step in the illustrative process is for each of the target processor elements to quiesce (block 612). To implement this illustrative step, the reintegration leader sends a message to the reintegration control program in each participating logical processor, and in turn the reintegration control program sends a message to the target processor elements to quiesce. In the illustrative diagram that accompanies this step, the quiesce message from the reintegration leader to the participating logical processors is illustrated by lines 646. The horizontal communication between reintegration control programs and the target processor elements are illustrated by lines 648 for the logical processor comprising processor elements PA1, PB1 and PC1, and by lines 650 for the logical processor comprising processor elements PA2, PB2 and PC2. Once each target processor element acknowledges to the reintegration control program within its logical processor that it has quiesced, the reintegration control programs of the logical processors acknowledge back to the reintegration leader, as indicated by lines 652.

The next step in the illustrative method of FIG. 6 is to configure the reintegration logics for the memory copy (block 616). To implement this illustrative step, the reintegration leader sends a message to at least one participating logical processor, and the reintegration control program of that logical processor passes the configuration message to the target processor element. The target processor element, in turn, configures its reintegration logic to apply a stream of duplicated memory writes, and I/O operations, from an upstream reintegration logic. Thus, I/O operations can be ongoing with the memory copy. Likewise, one non-failed processor element in the logical processor configures its respective reintegration logic to supply a stream of duplicated writes to the downstream reintegration logic. Because the computing system illustrated by the diagram that accompanies block 616 assumes that the participating logical processors share a memory channel, the reintegration leader need only send the command to reconfigure the reintegration logics to one of the logical processors. The illustrative diagram that accompanies this step shows the communication between the reintegration leader and the participating logical processor by line 654. The horizontal communication to the target processor element and the return acknowledgement is illustrated by lines 656. When configuration of the reintegration logics for memory copying is complete, the reintegration control program of the logical processor sends an acknowledgment to the reintegration leader, as illustrated by line 658.

The next step in the illustrative process is copying of memory. In accordance with embodiments of the invention, copying the memory involves allowing respective user programs in each participating logical processor to continue operation, and each logical processor also dispatches a background task which reads and subsequently writes each memory location to which its respective logical processor has write access. In the illustrative diagram that accompanies this step, the reintegration leader directing each participating logical processor to begin the memory copy is illustrated by lines 660. When each logical processor completes its background task of reading and subsequently writing each memory location, the reintegration control program of each logical processor sends an acknowledgment to the reintegration leader, as indicated by lines 662.

The next step in the illustrative process is to suspend operation of the user programs in the source processor elements and save state of those user programs (block 624). In this illustrative step, and at the direction of the reintegration leader, user programs are suspended, the register states for the user programs are saved, the cache is flushed for each processor element of each participating logical processor, and I/O is suspended (as discussed above). In embodiments where the reintegration leader can unambiguously ascertain that no I/O operations are in progress, suspension of the I/O may not be necessary. The reintegration leader informs the participating logical processors to perform these steps, and each logical processor acknowledges completion of these steps. In the illustrative diagram that accompanies this step, the reintegration leader commanding the participating logical processors to perform this step is illustrated by lines 664, and the acknowledgment of completion of these steps is illustrated by lines 666.

The next step in the illustrative process is to reconfigure the reintegration logics for transparent operation (block 628). Thus, the reintegration leader communicates with at least one of the participating logical processors commanding the target processor element to reconfigure the reintegration logic. In the illustrative diagram that accompanies this step, the reintegration leader commanding at least one logical processor to reconfigure their integration logic is illustrated by line 668. The horizontal communications between the source processor elements and the target processor element are illustrated by lines 670. The acknowledgment of the reconfiguration of the reintegration logic locally coupled to the target processor element is illustrated by line 672. It is noted that the reintegration logics locally coupled to each source processor element need not be reconfigured in this stage inasmuch as they are already configured to be transparent to memory reads and writes between their locally coupled processor elements and memory. In alternative embodiments, additional reconfiguration could take place, such as to change which stream of duplicate memory writes is coupled to the output port of each reintegration logic.

After reconfiguring the reintegration logics, the synchronization logics are configured to allow the target processor elements to participate in the voting system, and a branch address is provided to each target processor element (block 632). In this illustrative step, the reintegration leader sends a message to each participating logical processor, and the reintegration control program of each logical processor informs its respective synchronization logic that the target processor element is henceforth allowed to participate in the voting. Moreover, by way of a horizontal communication within the logical processor, each target processor element is provided a branch address at which to resume execution of programs, and this branch address is likewise used in each of the source processor elements. Finally, the reintegration control program of each participating logical processor sends an acknowledgment to the reintegration leader that the process is complete. Thereafter, the process ends (block 636) and each logical processor has its full complement of processor elements, and the copying and reintegration takes place without having to reset any of the source processor elements. In the illustrative diagram that accompanies this step, the command by the reintegration leader to each participating logical processor regarding instructing respective synchronization logics to allow the target processor elements into the voting system is illustrated by lines 674. Likewise, the branch address exchange between the reintegration control program and the target processor elements is illustrated by lines 676 for the logical processor comprising processor elements PA1, PB1 and PC1, and by lines 678 for the logical processor comprising processor elements PA2, PB2 and PC2. The acknowledgment that the memory copy and reintegration process is complete sent by each participating logical processor to the reintegration leader is illustrated by lines 680.

The illustrative reintegration discussed with respect to FIG. 6 is shown to involve only two target processor elements (based on the fact that these processor elements share a memory channel). In the event an entire multiprocessor computer system 10 is newly inserted and/or needs to be reset, the procedure is substantially the same as that illustrated in FIG. 6, except that all the logical processors participate (because each logical processor will have a target processor element on the multiprocessor computer system to be reset). Moreover, in illustrative embodiments where each multiprocessor computer system has two memory channels, with two processor elements sharing each memory channel, the copying of memory to the reset multiprocessor computer system takes place in two phases, one phase for the channel 0 processor elements, and one phase for the channel 1 processor elements.

The description of the various embodiments to this point has assumed only a single communication ring between reintegration logics and respective multiprocessor computer systems, such as illustrated by line 58 of FIG. 1. In alternative embodiments, multiple couplings exist between multiprocessor computer systems, possibly one each for each corresponding reintegration logic. In such embodiments, it is possible to have multiple active memory copies for purposes of reintegration in operation as between logical processors that do not share memory channels, and these embodiments too are within the scope and spirit of the invention.

Figure 5A:
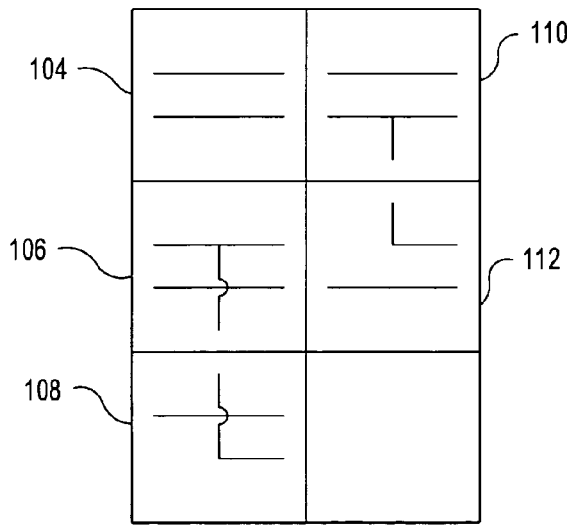
FIG. 5A illustrates in shorthand notation interconnections through the reintegration logic in accordance with embodiments of the invention.
Figure 5B:
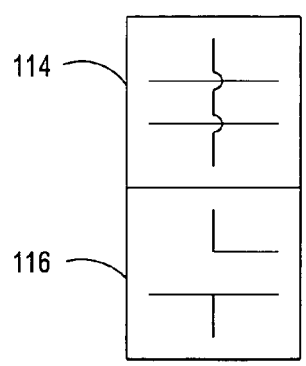
FIG. 5B also illustrates, in shorthand notation, interconnections through the reintegration logic in accordance with embodiments of the invention.

Returning to the illustrative reintegration logic of FIG. 4 and the shorthand notations for the various configurations of that reintegration logic of FIGS. 5A and 5B. In some embodiments, having two memory channels through each reintegration logic, it is envisioned that the source processor element for each memory copy will be the immediately upstream reintegration logic. However, in a tri-modular redundant system attempting to reintegrate the third processor element of the logical processor, the non-participating processor element of the logical processor still executes the background task and supplies its stream of duplicate memory writes. However, this stream of duplicate memory writes couples only to the next downstream reintegration logic, and is not utilized. It is possible, however, to configure the reintegration logic 56 to be transparent to memory reads and writes on its respective memory channels, and yet still pass a stream of duplicated memory writes from an upstream reintegration logic to a downstream reintegration logic, as illustrated by entry 114 of the table of FIG. 5B. In such a case, and in a tri-modular redundant system, it would be possible to select either of the operational processor elements as the source processor element for the copy.

Still referring to the table of FIG. 5B, the reintegration logic 56 illustrated in FIG. 4 could also be configured to apply a stream of duplicate memory writes from an upstream reintegration logic to memory channel 0, while simultaneously being transparent to memory reads and writes through memory channel 1 and creating a stream of duplicated memory writes to be coupled to downstream reintegration logics.

Finally, though while FIG. 6 describes only the coupling of memory and reintegration with regard to a single memory channel, because embodiments of the invention use multiple memory channels, it is possible that copying and reintegration could be taking place simultaneously. For example, while processor elements PC1 and PC2 are the target processor elements for a copy (being on channel 0 in the illustrative embodiments) other processor elements on the other illustrative memory channel 1 could likewise be targets for a memory copy, such as processor elements PA3 and PA4.

From the description provided herein, those skilled in the art are readily able to combine software created as described with appropriate general purpose or special purpose computer hardware to create a computer system and/or computer subcomponents embodying the invention, to create a computer system and/or computer subcomponents for carrying out the method of the invention, and/or to create a computer-readable media storing a software program to implement the method aspects of the invention.

The above discussion is meant to be illustrative of the principles and various embodiments of the present invention. Numerous variations and modifications will become to those skilled in the art once the above disclosure is fully appreciated. For example, while the lock-step operation and memory copying is discussed with respect to user level programs, any program that executes on a processor, for example diagnostic and maintenance mode programs, may benefit from the memory copying for reintegration as described herein. It is intended that the following claims be interpreted to embrace all such variations and modifications.

What is claimed is:

1. A method comprising:
    executing a first program in a first processor element of a first multiprocessor computer system, and executing a duplicate copy of the first program in a first processor element of second multiprocessor computer system, the executing in substantially lock-step;
    executing a second program in a second processor element of the first multiprocessor computer system, the first and second processors of the first multiprocessor computer system sharing an input/output (I/O) bridge;
    copying a memory area of the second program executing in the second processor element of the first multiprocessor computer system to a memory of a second processor element in the second multiprocessor computer system while the duplicate copies of the first program are executing in the first processor elements; and then
    executing duplicate copies of the second program in the second processor elements in lock-step.

2. The method as defined in claim 1 wherein each of the executing duplicate copies further comprises executing in loose lock-step.

3. The method as defined in claim 1 further comprising transitioning between copying and executing duplicate copies of the second program without resetting the second processor element of the first multiprocessor computer system.

4. The method as defined in claim 1 wherein copying further comprises:
    executing the second program in the second processor element of the first multiprocessor computer system and substantially simultaneously
    executing a program in the second processor element of the first multiprocessor computer system that reads and subsequently writes each memory location of the memory area of the second processor element of the first multiprocessor computer system; and
    duplicating memory writes and applying the memory writes to the memory of the second processor element of the second multiprocessor computer system.

5. The method as defined in claim 1 further comprising:
    executing duplicate copies of a reintegration control program in the first processor elements, the executing in lock-step;
    executing a copy of the reintegration control program in the second processor element of the first computer system;
    electing, as between the duplicate copies of the reintegration control program in the first processor elements and the reintegration control program in the second processor element of the first multiprocessor computer system, a reintegration leader; and
    controlling by the reintegration leader the copying of the memory area.

6. The method as defined in claim 5 wherein controlling further comprises directing duplication of memory writes and triggering execution of the program in the second processor element of the first multiprocessor computer system that reads and subsequently writes each memory location of the memory area.

7. The method as defined in claim 5 further comprising, upon failure of the processor element elected as reintegration leader, electing a remaining reintegration control program as the reintegration leader.

8. A system comprising:
    a first computer system comprising:
        a first processor element;
        a second processor element; and
        a memory;
    a second computer system coupled to the first computer system, the second computer system comprising:
        a first processor element;
        a second processor element; and
        a memory;
    wherein the first processor elements are configured to execute duplicate copies of a first program in lock-step;

wherein the second processor element of the first computer system is configured to execute a second program;

wherein a memory area of the second program in the second processor element of the first computer system is copied to the memory of a second computer system while the duplicate copies of the first program execute in the first processor elements; and wherein after the memory area is copied the second processor elements are configured to execute duplicate copies of the second program in lock-step.

9. The system as defined in claim 8 further comprising:

a reintegration logic of the first computer system coupling the processor elements of the first computer system to the memory of the first computer system, and wherein each processor element has a separate coupling to the memory through the reintegration logic;

a reintegration logic of the second computer system coupling the processor elements of the second computer system to the memory of the second computer system, and wherein each processor element couples to the memory through the reintegration logic;

wherein the reintegration logic of the first computer system couples to the reintegration logic of the second computer system; and wherein the reintegration logic of the first computer system is configured to duplicate memory writes by the second processor element of the first computer system, and provide the memory writes to the reintegration logic of the second computer system; and wherein the reintegration logic of the second computer system is configured to couple the writes to the memory of the second computer system.

10. The system as defined in claim 8 wherein first processor elements are configured to execute the duplicate copies of the first program in lock-step, but not in cycle-by-cycle lock step.

11. The system as defined in claim 8 further comprising:

a third computer system coupled to the first and second computer systems, the third computer system comprising:
  a first processor element;
  a second processor element; and
  a memory;

wherein the first processor elements are configured to execute duplicate copies of the first program in lock-step;

wherein the second processor element of the first and third computer systems are configured to execute duplicate copies of the second program in lock-step;

wherein a memory area of one of the second programs is copied to the memory of the second computer system while the duplicate copies of the first program execute in the first processor elements, and while the duplicate copies of the second program execute in the second processor elements of the first and third computer systems; and wherein after the memory area is copied the second processor elements are configured to execute duplicate copies of the second program in lock-step.

12. The system as defined in claim 11 further comprising a reintegration logic of the third computer system coupling the processor elements of the third computer system to the memory of the third computer system, and wherein each processor element couples to the memory through the reintegration logic.

13. A system comprising:

a first computer system comprising:
  a first processor element coupled to a first portion of a memory by way of a logic device;
  a second processor element coupled to a second portion of the memory by way of the logic device;

a second computer system coupled to the logic device;

wherein the logic device selectively:
  couples the first processor element to the first portion of the memory, couples the second processor element to the second portion of the memory of the first computer system, and duplicates memory writes between the second processor element and second portion and sends the duplicate memory writes to the second computer system; or
  couples the first processor element to the first portion of the memory, couples the second processor element to the second portion of the memory, and duplicates memory writes between the first processor element and first portion of the memory and sends the duplicate memory writes to the second computer system.

14. The system as defined in claim 13 further comprising:

wherein the second computer system sends a stream of duplicate memory writes to the logic device; and wherein the logic device selectively:
  couples the first processor element to the first portion of the memory, and couples the second processor element to the second portion of the memory;
  couples the stream of duplicate memory writes from the second computer system to the first portion of the memory, and couples the second processor element to the second portion of the memory; or
  couples the first processor element to the first portion of the memory, and couples the stream of duplicate memory writes from the second computer system to the second portion of the memory.

15. The system as defined in claim 13 further comprising:

wherein the second computer system sends a stream of duplicate memory writes to the logic device; and wherein the logic device selectively couples the stream of duplicate memory writes from the second computer system to the first portion of the memory, couples the second processor element to the second portion of the memory, and duplicates memory writes between the second processor element and second portion of the memory and sends the duplicate memory writes to the second computer system or a third computer system.

16. The logic device as defined in claim 13 further comprising:

wherein the second computer system sends a stream of duplicate memory writes to the logic device; and wherein the logic device selectively couples the first processor element to the first portion of the memory, couples the second processor element to the second portion of the memory, and couples the stream of duplicate memory writes from the second computer system to a third computer system.

17. A logic device comprising:

a first and second processor communication ports that couple to respective processor elements;

a first and second memory communications ports that couple to memory;

a duplicate memory write input port that couples to a stream of duplicate memory writes; and a duplicate memory write output port;

wherein the logic device selectively:
  couples the first processor communication port to the first memory communication port, couples the second processor communication port to the second memory communication port, and duplicates memory writes between the second processor communication port and second memory port and sends the duplicate memory writes out the memory write output port; or couples the first processor communication port to the first memory communication port, couples the second processor communication port to the second memory communication port, and duplicates memory writes between the first processor communication port and first memory port and sends the duplicate memory writes out the memory write output port.

18. The logic device as defined in claim 17 wherein the logic device further selectively:

couples the first processor communication port to the first memory communications port, and couples the second processor communication port to the second memory port;

couples the duplicate memory write input port to the first memory communications port, and couples the second processor communication port to the second memory communication port; or couples the first processor communication port to the first memory communications port, and couples the duplicate memory write input port to the second memory communications port.

19. The logic device as defined in claim 17 wherein the logic device further selectively couples the duplicate memory write input port to the first memory communications port, couples the second processor communication port to the second memory communication port, and duplicates memory writes between the second processor communication port and second memory port and sends the duplicate memory writes out the memory write output port.

20. The logic device as defined in claim 17 wherein the logic device further selectively couples the first processor communication port to the first memory communications port, couples the second processor communication port to the second memory port, and couples the duplicate memory write input port to the duplicate memory write output port.

21. A system comprising:

a first system means for executing programs comprising a first and second processor means;

a second system means for executing programs comprising a first and second processor means;

wherein the first processors means execute duplicate copies of a first program in lock-step;

wherein the second processor means of the first system means executes a second program;

wherein a memory area of the second program that executes in the second processor means of the first system means is copied to a memory area of the second system means while the duplicate copies of the first program execute in the first processor means; and wherein after the memory area is copied the second processor means execute duplicate copies of the second program in lock-step.

22. The system as defined in claim 21 further comprising:

a first means for coupling the processor means of the first system means to memory means of the first system means, and wherein each processor means has a separate coupling to the memory means through the means for coupling;

a second means for coupling the processor means of the second system means to memory means of the second system means, and wherein each processor means has a separate coupling to the memory means through the means for coupling;

wherein the first means for coupling couples to the second means for coupling; and wherein the first means for coupling duplicates memory writes by the second processor means of the first system means, and provides the duplicate memory writes to the second means for coupling; and wherein the second means for coupling couples the duplicate memory writes to the memory means of the second system means.

* * * * *

UNITED STATES PATENT AND TRADEMARK OFFICE
CERTIFICATE OF CORRECTION

| | | |
|---|---|---|
| PATENT NO. | : 7,933,966 B2 | Page 1 of 1 |
| APPLICATION NO. | : 11/114318 | |
| DATED | : April 26, 2011 | |
| INVENTOR(S) | : Thomas J. Kondo et al. | |

It is certified that error appears in the above-identified patent and that said Letters Patent is hereby corrected as shown below:

In column 11, line 6, delete "56" and insert -- 57 --, therefor.

Signed and Sealed this
Fifteenth Day of November, 2011

David J. Kappos
*Director of the United States Patent and Trademark Office*